United States Patent
Himle et al.

(10) Patent No.: US 6,714,368 B1
(45) Date of Patent: Mar. 30, 2004

(54) METHOD AND APPARATUS FOR SELECTING DATA DENSITIES ON DISK SURFACES IN A DISK DRIVE BASED UPON MEASURED THERMAL DECAY RATES OF THE DISK SURFACES DURING SELF-TEST PROCEDURE

(75) Inventors: Jenny Himle, Boulder, CO (US); Kurt Wiesen, Boulder, CO (US)

(73) Assignee: Maxtor Corporation, Longmont, CO (US)

( * ) Notice: Subject to any disclaimer, the term of this patent is extended or adjusted under 35 U.S.C. 154(b) by 299 days.

(21) Appl. No.: 09/879,289

(22) Filed: Jun. 11, 2001

Related U.S. Application Data

(60) Provisional application No. 60/210,853, filed on Jun. 9, 2000.

(51) Int. Cl.[7] .............................................. G11B 27/36
(52) U.S. Cl. ........................... 360/31; 360/48; 360/60; 324/212
(58) Field of Search ............................. 360/31, 48, 60; 324/210, 212, 226

(56) References Cited

U.S. PATENT DOCUMENTS

| | | | |
|---|---|---|---|
| 6,147,488 A | * 11/2000 | Bamba | 360/31 |
| 6,603,617 B1 | * 8/2003 | Cross | 360/31 |

OTHER PUBLICATIONS

U.S. patent application Ser. No. 09/791,056, Cross, filed Feb. 21, 2001.

Dhagat, P. et al.; "Sub–millisecond Spin–stand Measurements of Thermal Decay in Magnetic Recordings"; Submitted IEEE Trans. Magn., Mar. 5, 1999.

Toigo, "Avoiding a Data Crunch," *Scientific American*, May 2000, pp. 57, 59–61, 64–67 and 70–74.

* cited by examiner

*Primary Examiner*—Alan T. Faber
(74) *Attorney, Agent, or Firm*—Tejpal S. Hansra

(57) ABSTRACT

A method and apparatus for selecting data densities on disk surfaces in a disk drive based upon measured thermal decay rates of the disk surfaces is disclosed. First and second data patterns having first and second data densities, respectively, are written onto a first disk surface. The first and second data patterns are read, upon expiration of at least a first predetermined time interval, and first and second thermal decay rates associated with the first and second data patterns, respectively, are calculated. A determination is made as to whether the first and second thermal decay rates, respectively, satisfy first and second thermal decay rate requirements. Finally, a density at which to record data on the first disk surface is selected based upon whether the first thermal decay rate meets the first thermal decay rate requirement and whether the second thermal decay rate meets the second thermal decay rate requirement.

43 Claims, 5 Drawing Sheets

Writing

Information data

Writing currents

Medium magnetizations

Reading

Magnetic flux changes in read head

Waveforms of read voltage

METHOD AND APPARATUS FOR SELECTING DATA DENSITIES ON DISK SURFACES IN A DISK DRIVE BASED UPON MEASURED THERMAL DECAY RATES OF THE DISK SURFACES DURING SELF-TEST PROCEDURE

CROSS-REFERENCE TO RELATED APPLICATION

Priority is claimed from U.S. provisional patent application serial No. 60/210,853 filed Jun. 9, 2000 entitled "Measuring Thermal Decay of Media During Self Test, Allowing Variable KBPI Maximum Per Disk," which is incorporated by reference herein in its entirety.

FIELD OF THE INVENTION

The present invention relates to magnetic storage devices and, more particularly, to computer disk drives. More specifically, the present invention relates to determining a data density at which to store data on a disk surface by measuring thermal decay rates for the disk surface for various data densities.

BACKGROUND OF THE INVENTION

Computer disk drives store digital information on magnetic disks which are coated with a magnetic material that is capable of changing its magnetic orientation in response to an applied magnetic field. Typically, the digital information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

More specifically, during operation of a conventional disk drive, a magnetic transducer is placed above a desired track of the disk while the disk is spinning. Writing is performed by delivering a write signal having a variable current to the transducer while the transducer is held close to the track. The write signal creates a variable magnetic field at a gap portion of the transducer that induces magnetic polarity transitions into the desired track which constitute the data being stored.

Reading is performed by sensing the magnetic polarity transitions on the rotating track with the transducer. As the disk spins below the transducer, the magnetic polarity transitions on the track present a varying magnetic field to the transducer. The transducer converts the varying magnetic field into an analog read signal that is delivered to a read channel for appropriate processing. The read channel converts the analog read signal into a properly-timed digital signal that can be recognized by a host computer system.

The transducer can include a single element, such as an inductive read/write element for use in both reading and writing, or it can include separate read and write elements. Typically, transducers include separate elements for reading and writing. Such transducers are known as dual element heads and usually include a magneto-resistive (MR) read element or giant magneto-resistive (GMR) read element for performing the read function.

Dual element heads are advantageous because each element of the transducer can be optimized to perform its particular function. For example, MR read elements are more sensitive to small variable magnetic fields than are inductive heads and, thus, can read much fainter signals from the disk surface. Because MR elements are more sensitive, data can be more densely packed on the surface with no loss of read performance.

MR read elements generally include a strip of magneto-resistive material that is held between two magnetic shields. The resistance of the magneto-resistive material varies almost linearly with applied magnetic field. During a read operation, the MR strip is held near a desired track, with the varying magnetic field caused by the magnetic transitions on the track. A constant DC current is passed through the strip resulting in a variable voltage across the strip. By Ohm's law (i.e., V=IR), the variable voltage is proportional to the varying resistance of the MR strip and, hence, is representative of the data stored within the desired track. The variable voltage signal (which is the analog read signal) is then processed and converted to digital form for use by the host. GMR read elements operate in a similar manner.

FIGS. 1(a)–1(e) are simplified diagrammatic representations which illustrate how data is written as transitions on a disk surface and how the transitions are read from the disk surface as data. As background, a transition is where the magnetization in the disk media changes. In general, there are two types of transitions possible; that is, where south poles face south poles and where north poles face north poles.

FIGS. 1(a)–(c) illustrate the write process in simplified form. Specifically, FIG. 1(a) illustrates a data sequence in the form of "ones" and "zeros," which is to be stored on the disk media. FIG. 1(b) illustrates the write current in the write coil for one method of storing the data sequence. In such method, the current through the write coil is reversed at each "one" and remains the same at each "zero" (see FIGS. 1(a) and 1(b)). Consequently, as the disk media is rotated under the write head, the disk media is magnetized as shown in FIG. 1(c). It should be noted that magnetic transitions occur at each "one" and not at each "zero." It should also be noted that FIG. 1(c) represents the magnetization of the media for a portion of a track, which is shown in a linear rather than arcuate shape, as will be understood by those skilled in the art.

FIGS. 1(d) and 1(e) illustrate the read process in simplified form. As mentioned above, as the disk media is rotated under the read head, a constant DC current is passed through the MR strip in the read head. The magnetic transitions stored in the disk media cause the magnetic field applied to the MR strip in the read head to vary, as shown in FIG. 1(d). Since the resistance of the magneto-resistive material varies almost linearly with applied magnetic field, the varying magnetic field caused by the magnetic transitions on the disk media results in a variable voltage across the strip. By Ohm's law (i.e., V=IR), the variable voltage is proportional to the varying resistance of the MR strip and, hence, is representative of the data stored within the desired track, as shown in FIG. 1(e). The variable voltage signal (which is the analog read signal) is then processed and converted to digital form for use by the host.

The amount of information capable of being stored on a disk surface is determined, in part, by the minimum size of individual transitions. As is known to those skilled in the art, the minimum size of individual transitions is based (among other things) upon the grain size of the magnetic material forming the magnetic layer of the disk surface. In order to increase the amount of information capable of being stored on the disk surface, disk manufacturers have been continuously reducing the grain size of the magnetic material and, hence, have reduced the minimum size of individual transitions. For the magnetic layer of the disk, the remnant magnetization-thickness product has also been reduced to achieve higher linear densities and enhanced writer performance. Most of this reduction has been achieved by reducing the thickness of the magnetic layer of the disk, and hence, the grain thickness, which reduces the grain size.

Traditionally, about 500 to 1000 grains of magnetic material were required to store a bit of information. However, at present, a transition may be stored in about 250 grains of magnetic material, assuming a density of 25 Gb/in$^2$. It is expected that the number of grains of magnetic material required to store a bit of information will continue to decrease over time. To reduce transition noise and increase the number of grains in a transition, both the diameter of the grains and the separation between the grains have been decreased. In fact, the diameter of the grains has decreased from approximately 15 nm down to approximately 9–10 nm. This has driven disk vendors to produce disks with smaller grain volumes.

As will be understood by those skilled in the art, each grain has a certain magnetic anisotropy energy associated with it. More specifically, the anisotropy energy of a grain is a fixed amount of energy required to "hold" a stored direction of magnetization in the magnetic material. As grain sizes have been reduced, the anisotropy energy associated with each grain has been reduced. In fact, the anisotropy energy of each grain has been reduced such that it is comparable to the ambient thermal energy in the disk drive. Consequently, the thermal energy in the disk drive randomly excites grains in the magnetic material causing changes in the direction of magnetization of the magnetic material over time. Ultimately, if a threshold number of grains change their direction of magnetization, information stored on the disk may be lost. This phenomenon is known as the superparamagnetic effect (or thermal decay).

In other words, the superparamagnetic effect is a thermal relaxation of information stored on the disk surface. Because the superparamagnetic effect may occur at room temperature, over time, information stored on the disk surface will begin to decay. Once the stored information decays beyond a threshold level, it will be unable to be properly read by the read head and the information will be lost.

More specifically, the superparamagnetic effect manifests itself by a loss in amplitude in the readback signal over time. Accordingly, this causes the bit error rate (BER) to increase. As is well known, the BER is the ultimate measure of drive performance in a disk drive.

In general, a certain number of bit errors may be corrected by a disk drive's error correction code (ECC). However, as is well-known, ECC information adds to the overall overhead of a disk drive, which limits the amount of information that can be stored on a disk surface. Accordingly, disk drives exhibiting high bit error rates that require correction by a large amount of ECC overhead are generally disfavored.

In designing disk drives for sale to consumers, disk drive manufacturers determine the storage capacity of a particular model of a disk drive in advance of its construction. Furthermore, the storage capacity of each disk surface in the disk drive is also determined in advance of the disk drive's construction.

In ascertaining the thermal decay rate for disk surfaces in a drive, disk drive manufacturers have traditionally measured only a representative sample of the disk surfaces prior to installation into the disk drive. The inventors of the present invention have recognized that this approach is problematic because thermal decay rates vary from disk surface to disk surface due to the varying properties between disk surfaces. In fact, properties of disk surfaces may vary, not only between different disk manufacturers, but also between the same disk manufacturer. For example, the grain size and anisotropy energies of the magnetic material may vary between disk surfaces of the same manufacturer.

The inventors of the present invention have also recognized that the thermal decay rate is dependent, in part, on the density at which data is stored on a disk surface (i.e., the data density). If the data density for each of the disk surfaces is determined prior to manufacture, then there is a potential that one or more of the disk surfaces will have an unacceptable thermal decay rate after manufacture, which may lead to drive failures after drives are sold to consumers.

Accordingly, it would be advantageous to measure the thermal decay rate of one or more disk surfaces of a disk drive, after its construction, at one or more data densities. Furthermore, it would be advantageous to select the data density of one or more disk surfaces based upon measured thermal decay rates from the disk surfaces. Even further, it would be advantageous to select the data densities of the disk surfaces such that the overall storage capacity of the disk drive meets or exceeds a predetermined storage capacity.

SUMMARY OF THE INVENTION

The present invention is designed to overcome the aforementioned problems and meet the aforementioned, and other, needs.

In one embodiment, a method for selecting data densities on disk surfaces in a disk drive based upon measured thermal decay rates of the disk surfaces during a self-test procedure is disclosed. In such method, a disk drive is provided which includes, at least a first disk surface and at least a first head. A first data pattern having a first data density and a second data pattern having a second data density are written onto the first disk surface using the first head. The first and second data patterns are read from the disk surface using the first head upon expiration of at least a first predetermined time interval. The first thermal decay rate associated with the first data pattern and the second thermal decay rate associated with the second data pattern are calculated based at least upon the information respectively read from each of the data patterns following the expiration of the first predetermined time interval. A determination is made as to whether the first thermal decay rate associated with the first data pattern satisfies a first thermal decay rate requirement and whether the second thermal decay rate associated with the second data pattern satisfies a second thermal decay rate requirement. A density at which to record data on the first disk surface is selected based upon whether the first thermal decay rate meets the first thermal decay rate requirement and whether the second thermal decay rate meets the second thermal decay rate requirement.

It should be understood that this summary section is only intended to provide an overview of the invention. Furthermore, this summary section does not necessarily disclose all features and embodiments of the invention. Instead, further details are provided in the detailed description section and the drawings. Thus, other objects, embodiments, features, aspects and advantages of the invention will be apparent from the following specification taken in conjunction with the following drawings.

DETAILED DESCRIPTION OF THE PREFERRED EMBODIMENT

Figure 1A:
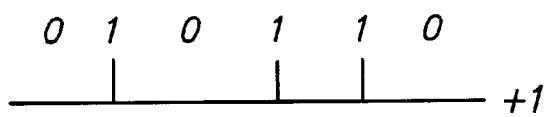
FIGS. 1(a)–(e) are simplified diagrammatic representations which illustrate the process of writing data as transitions on a disk surface and the process of reading transitions from the disk surface as data.
Figure 1B:
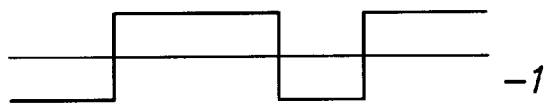
Figure 1C:
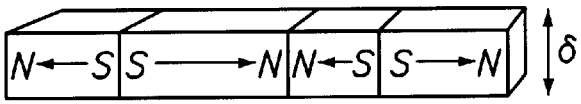
Figure 1D:
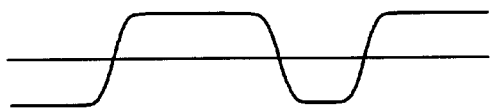
Figure 1E:
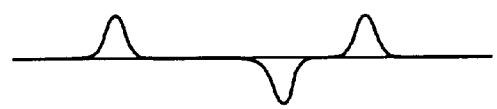

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 2:
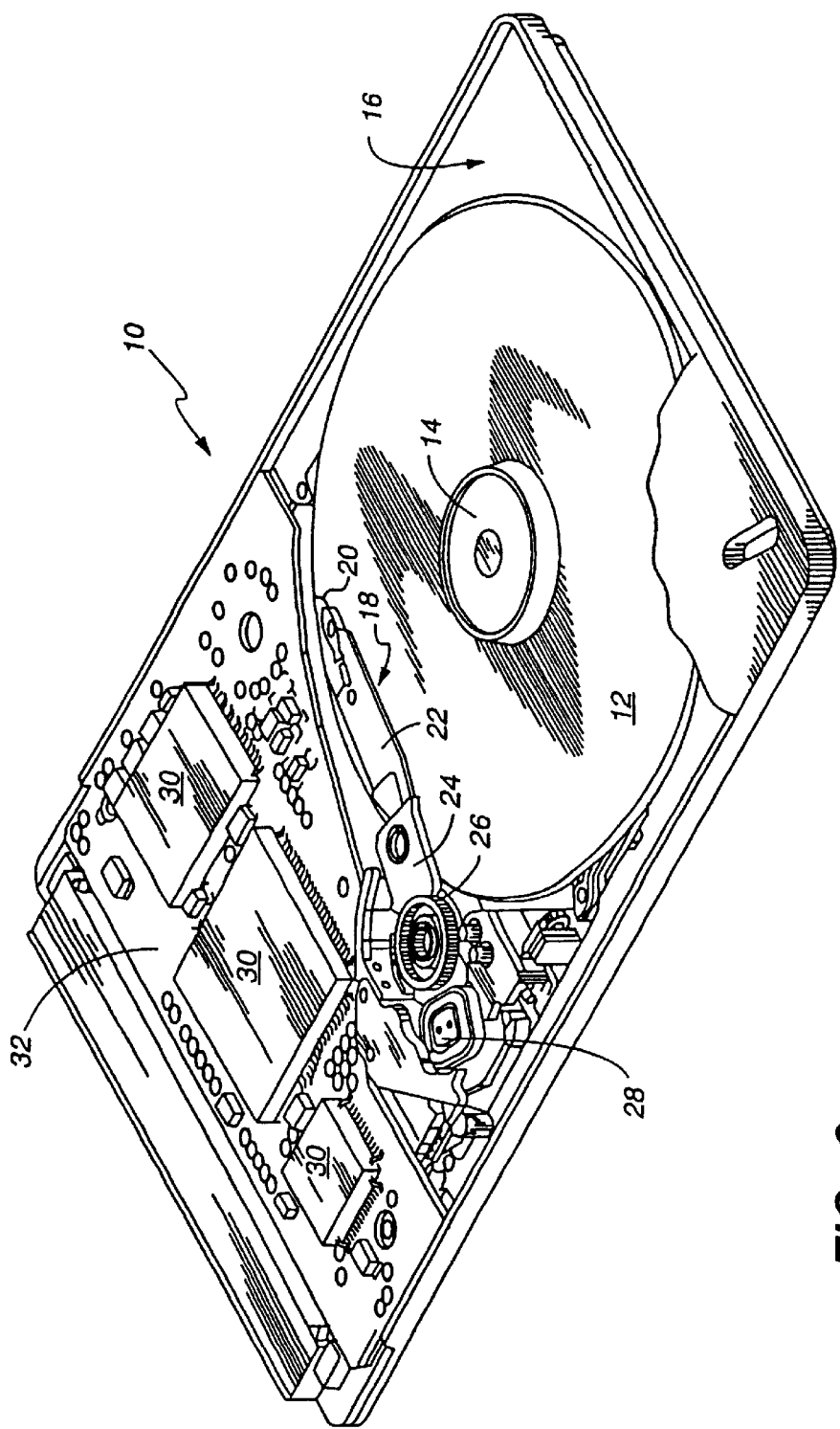
FIG. 2 is a diagrammatic representation of a disk drive in which the present invention may be implemented.

A disk drive 10 with which the present invention may be used is illustrated in FIG. 2. The disk drive comprises a disk 12 that is rotated by a spin motor 14. The spin motor 14 is mounted to a base plate 16.

The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device.

It should be understood that the disk drive 10 may include a plurality of disks 12 and, therefore, a plurality of corresponding actuator arm assemblies 18. It should also be understood that the principles described herein are equally applicable to such disk drives.

Figure 3:
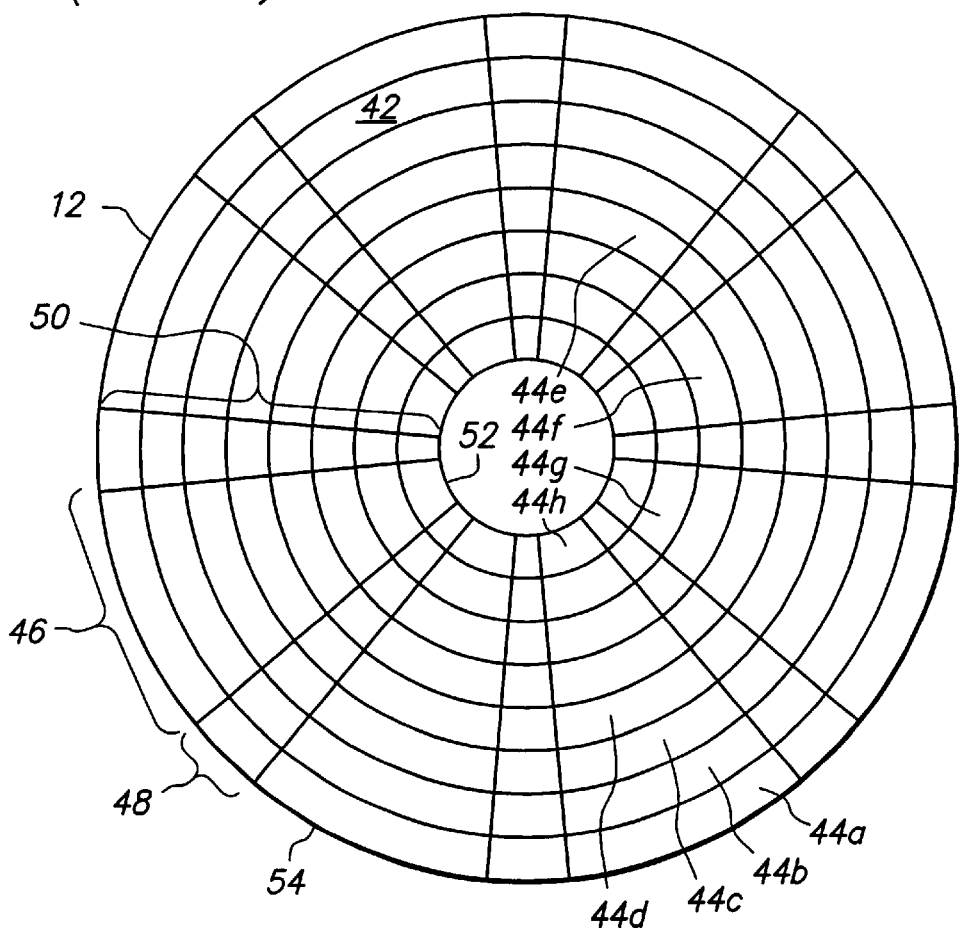
FIG. 3 is a diagrammatic representation illustrating a disk surface which has been formatted to be used in conjunction with a sectored servo system.

FIG. 3 is a diagrammatic representation of a simplified top view of a disk 12 having a surface 42 which has been formatted to be used in conjunction with a conventional sectored servo system (also known as an embedded servo system). As illustrated in FIG. 3, the disk 12 includes a plurality of concentric tracks 44a–44h for storing data on the disk's surface 42. Although FIG. 3 only shows a relatively small number of tracks (i.e., 8) for ease of illustration, it should be appreciated that typically many thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54). The servo sectors 48 are used to position the head 20 associated with each disk 12 during operation of the disk drive 10.

In conceiving of the present invention, the inventors have made a number of observations relating to thermal decay, some of which are listed below. Specifically, the inventors have recognized that the thermal decay rate generally increases as data densities increase. Further, the inventors have recognized that the thermal decay rate experienced by data sectors located towards the inner diameter of the disk surface is greater than the thermal decay rate experienced by data sectors located closer to the outer diameter of the disk surface, since data densities at such data sectors are higher relative to data densities of data sectors located closer to the outer diameter of the disk surface. Even further, the inventors have recognized that the problems associated with thermal decay are likely to occur in data sectors, as opposed to servo sectors, since data densities are relatively higher therein. Yet further, the inventors of the present invention have recognized that thermal decay rates vary from disk surface to disk surface due to the varying properties between disk surfaces. Yet even further, to the first order, thermal decay rates are linear with respect to the logarithm of time (i.e., as much thermal decay is experience fractionally between 1 milliseconds and 10 milliseconds, as is experienced between 1 year and 10 years).

With these and other observations in mind, the inventors of the present invention have developed a method and apparatus for selecting data densities on disk surfaces in a disk drive based upon measured thermal decay rates of the disk surfaces during a self-test procedure. The particulars of certain embodiments of the present invention will now be described with reference to FIGS. 4A, 4B and 5.

Figure 4A:
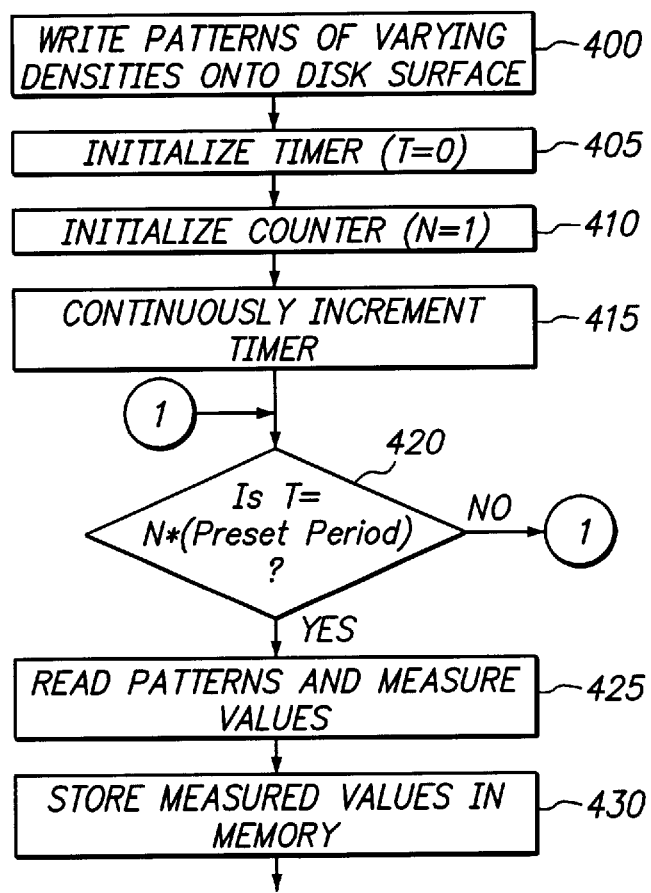
FIGS. 4A and 4B comprise a simplified flow diagram illustrating one manner of implementing the present invention; and, FIG. 5 is a diagrammatic representation, similar to that shown in FIG. 3, that contains reference sectors which may be used in conjunction with the present invention.
Figure 4B:
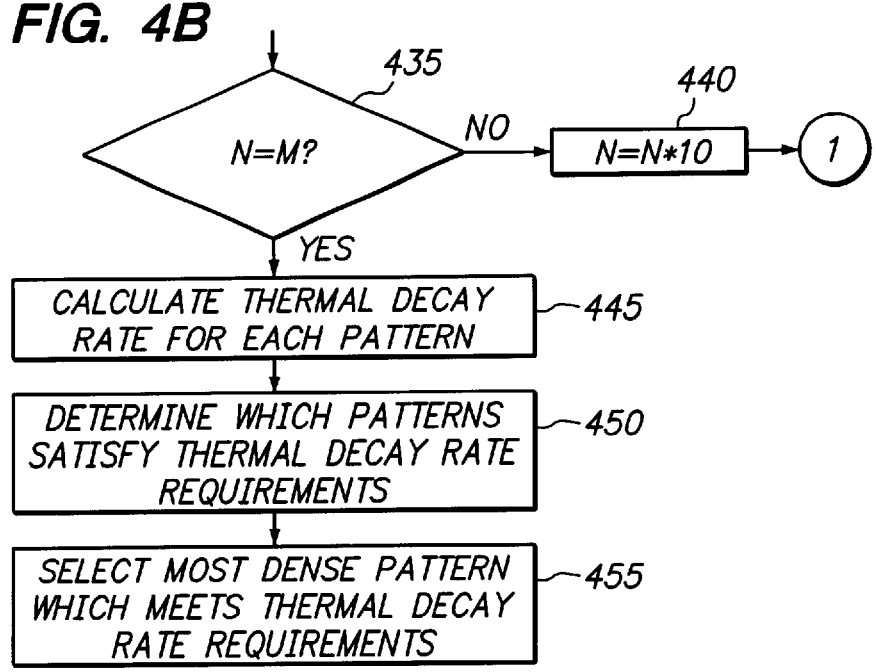

FIGS. 4A and 4B comprise a simplified flow diagram illustrating one method of implementing the present invention. It should be understood that there are many other ways of implementing the present invention and FIGS. 4A and 4B show one of a number of possibilities.

Figure 5:
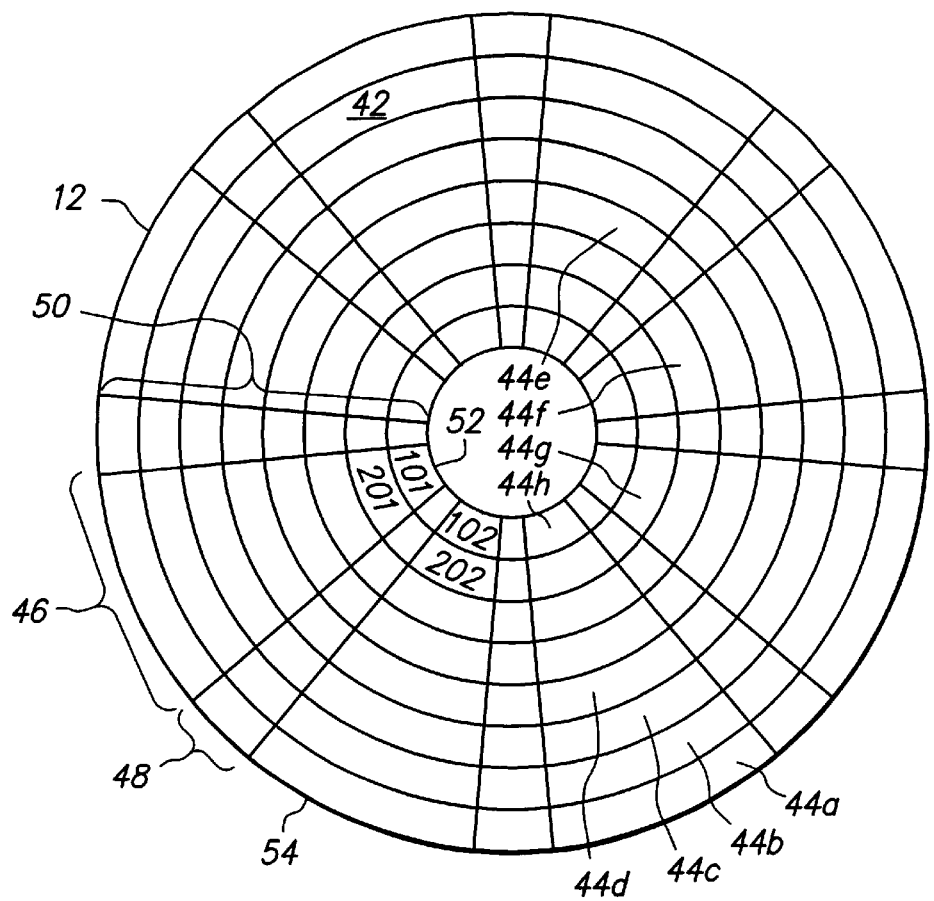

FIG. 5 is a diagrammatic representation, similar to that shown in FIG. 3, except that the disk surface 42 includes first and second reference sectors 101, 102 and third and fourth reference sectors 201, 202, all of which may be used in conjunction with the present invention. Specifically, first and second reference sectors 101, 102 may be used to store a first pattern written at a first data density, while third and fourth reference sectors 201, 202 may be used to store a second pattern written at a second data density. It should be noted that more or less than two reference sectors may be used to store a single pattern. Furthermore, it should be noted that more or less than two patterns may be used. Even further, it should be noted that the first and second patterns may be stored on the same track or on different tracks. Yet further, it should be noted that the first and second patterns need not be located in a "circumferentially aligned" position, as shown in FIG. 5.

In the preferred embodiment of the present invention, the steps set forth in FIG. 4 are performed during the disk drive's self-test procedure, which follows assembly of the disk drive, as will be understood by those skilled in the art. It should be noted, however, that the method of the present invention is not required to be performed only during the self-test procedure and, further, that the method of FIG. 4 is one of many ways to implement the present invention.

With reference to FIGS. 4 and 5, in step 400, a first pattern is written at a first data density (e.g., in first and second reference sectors 101, 102) and a second pattern is written at a second data density (e.g., in third and fourth reference sectors 201, 202). Because the thermal decay rate increases as bit spacing decreases (i.e., as bit density increases) and because the bit spacing is generally near a minimum at the inner diameter 52, the first and second patterns are preferably written near the inner diameter 52 of the disk surface 42. Among other things, each of the patterns may be written at a single tone frequency (e.g., a 1T pattern, which is the highest permissible frequency of transitions) or may be written as test data (e.g., a seemingly random sequence of transitions having a pre-defined density).

Once the patterns have been written, a timer is initialized by being set to zero, in step 405. Furthermore, a counter is initialized by being set to one, in step 410. In addition, after the timer has been initialized, the timer is continuously incremented (step 415) to keep track of the time that has lapsed since initialization.

In step 420, a determination is made as to whether N times a preset period of time has passed. Preferably, the preset period of time is the time required to write a pattern and, approximately one revolution later, read it back. For example, for one particular disk drive, the preset period of time may be 11 milliseconds. However, it should be understood that the preset period of time may be any value.

If the requisite period of time has not passed, the timer continues to be monitored until the requisite period of time has, in fact, passed. Once the requisite time has passed, the first and second patterns are then read (step 425). As mentioned above, the patterns may be written as a single tone frequency or as test data, among other things. If the pattern being read was written as a single tone frequency, the amplitude of the readback signal is measured. Similarly, if the pattern being read was written as test data, the bit error rate (BER) or mean-square-error is measured. The measured values are then stored in memory (step 430).

Next, a determination is made as to whether a preset number of measured values have been obtained (step 435). If a preset number of measured values have not yet been obtained, the value of N is multiplied by 10 (step 440), so that the patterns are read again when the timer reaches the next decade of time (steps 420 and 425). For example, if the first preset period of time was 11 milliseconds (as given above), the next measurement would occur at 110 milliseconds (i.e., the next decade of time). Furthermore, the following measurement would occur at 1100 milliseconds (i.e., the following decade of time).

Preferably, the preset number of measured values (e.g., measured values at 11 milliseconds, 110 milliseconds and 1100 milliseconds) is at least three. However, it should be understood that the present number of measured values may be more or less than three.

If the preset number of values has been obtained, then the thermal decay rate for each pattern is calculated using the measured values (step 445). Next, a determination is made as to which of the patterns satisfy thermal decay rate requirements (step 450).

Subsequently, the pattern having the highest data density which satisfies the thermal decay rate requirements is selected (step 455). Accordingly, data is written at (or below) the data density of the selected pattern for the disk surface. Further, the same or a similar process may be used for all the other disk surfaces in the disk drive. Thus, reliability of the disk drive, from a thermal decay standpoint, can be ensured.

In order to ensure that predetermined storage capacity requirement for a disk drive is met, the data density for each disk surface may be tallied. If the total capacity from all of the disk surfaces does not meet the predetermined storage capacity requirement for the disk drive, then the disk drive would fail the self-test procedure.

The process set forth in FIGS. 4A and 4B (or a similar process) may be performed at ambient temperature. However, because the thermal decay rate increases as temperature increase and because disk drives generally operate at temperatures greater than ambient temperature, the disk surfaces may be heated when determining the decay rate of the disk surfaces. Alternatively, an approximation of the thermal decay rate that would be experienced at the operating temperature of a disk drive may be made using the thermal decay rate of the disk surfaces determined at ambient temperature.

In another embodiment, instead of writing multiple patterns, a single pattern may be written at a first data density. If the pattern did not meet thermal density requirements, a second pattern could be written at a lower data density. The process could be repeated until a pattern is written at a data density which meets thermal density requirements. However, if a predetermined minimum data density is not met, then the drive could be failed.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:

providing, in a disk drive, at least a first disk surface and at least a first head;

writing at least a first data pattern of a first data density and a second data pattern of a second data density on the first disk surface using the first head;

reading the first and second data patterns from the first disk surface using the first head upon expiration of at least a first predetermined time interval;

calculating a first thermal decay rate associated with the first data pattern;

calculating a second thermal decay rate associated with the second data pattern;

determining whether the first thermal decay rate associated with the first data pattern satisfies a first thermal decay rate requirement;

determining whether the second thermal decay rate associated with the second data pattern satisfies a second thermal decay rate requirement; and, selecting a density at which to record data on the first disk surface based upon whether the first thermal decay rate meets the first thermal decay rate requirement and whether the second thermal decay rate meets the second thermal decay rate requirement.

2. The method of claim 1 wherein the data density at which to record data on the first disk surface is equal to the first data density when the first thermal decay rate requirement has been satisfied and the second thermal decay rate requirement has not been satisfied.

3. The method of claim 1 wherein the data density at which to record data on the first disk surface is equal to the first data density when both the first thermal decay rate requirement and the second thermal decay rate requirement have been satisfied, and when the first data density is greater than the second data density.

4. The method of claim 1 wherein the data density at which to record data on the first disk surface is equal to the second data density when both the first thermal decay rate requirement and the second thermal decay rate requirement have been satisfied, and when the second data density is greater than the first data density.

5. The method of claim 1 wherein the data density at which to record data on the first disk surface is equal to the second data density when the first thermal decay rate requirement has not been satisfied and the second thermal decay rate requirement has been satisfied.

6. The method of claim 1 wherein the first data pattern is written as a single tone frequency.

7. The method of claim 1 wherein the first data pattern is written as a seemingly random sequence of transitions.

8. The method of claim 1 wherein the first data pattern is written in at least one data sector.

9. The method of claim 1 wherein the first data pattern is written on a track near an inner diameter of the disk surface.

10. The method of claim 1 wherein the data density at which to record data on the first disk surface is determined during a self-test procedure.

11. The method of claim 1 wherein the data density at which to record data on the first disk surface is stored in memory.

12. The method of claim 11 wherein a data density at which to record data on at least a second disk surface is added to the data density at which to record data on the first disk surface to determine whether a total storage capacity of the disk drive has been met.

13. The method of claim 12 wherein the disk drive is considered to have passed a self-test procedure if the total storage capacity of the disk drive has been met.

14. A method comprising the steps of:
providing, in a disk drive, at least a first disk surface and at least a first head;
writing at least a first data pattern of a first data density on the first disk surface using the first head;
reading the first data pattern from the first disk surface using the first head upon expiration of at least a first predetermined time interval;
calculating a first thermal decay rate associated with the first data pattern;
determining whether the first thermal decay rate associated with the first data pattern satisfies a first thermal decay rate requirement; and,
deciding whether to record data on the disk surface at the first data density based upon whether the first thermal decay rate meets the first thermal decay rate requirement.

15. The method of claim 14 wherein the data density at which to record data on the first disk surface is equal to the first data density when the first thermal decay rate requirement has been satisfied.

16. The method of claim 14 wherein a second data pattern of a second data density, lower than the first data density, is written onto the first disk surface if the first thermal decay rate fails to satisfy the first thermal decay rate requirement.

17. The method of claim 14 wherein the first data pattern is written as a single tone frequency.

18. The method of claim 14 wherein the first data pattern is written as a seemingly random sequence of transitions.

19. The method of claim 14 wherein the first data pattern is written in at least one data sector.

20. The method of claim 14 wherein the first data pattern is written on a track near an inner diameter of the disk surface.

21. The method of claim 14 wherein the data density at which to record data on the first disk surface is determined during a self-test procedure.

22. A method comprising the steps of:
providing, in a disk drive, at least a first disk surface and at least a first head;
writing at least a first data pattern of a first data density and a second data pattern of a second data density on the first disk surface using the first head;
repeatedly reading both the first data pattern and the second data pattern from the first disk surface using the first head upon expiration of predetermined time intervals;
storing at least a first read value from the first data pattern and a first read value from the second data pattern in memory;
calculating a first thermal decay rate associated with the first data pattern and a second thermal decay rate associated with the second data pattern using the first read value from the first data pattern and the first read value from the second data pattern, respectively;
determining whether the first thermal decay rate associated with the first data pattern satisfies a first thermal decay rate requirement;
determining whether the second thermal decay rate associated with the second data pattern satisfies a second thermal decay rate requirement; and,
selecting a density at which to record data on the disk surface based upon whether the first thermal decay rate meets the first thermal decay rate requirement and whether the second thermal decay rate meets the second thermal decay rate requirement.

23. The method of claim 22, wherein the predetermined time intervals include at least two decades of time.

24. The method of claim 23, wherein the decades of time are successive decades of time.

25. The method of claim 23 wherein the data density at which to record data on the first disk surface is equal to the first data density when the first thermal decay rate requirement has been satisfied and the second thermal decay rate requirement has not been satisfied.

26. The method of claim 23 wherein the data density at which to record data on the first disk surface is equal to the first data density when both the first thermal decay rate requirement and the second thermal decay rate requirement have been satisfied, and when the first data density is greater than the second data density.

27. The method of claim 23 wherein the data density at which to record data on the first disk surface is equal to the second data density when both the first thermal decay rate requirement and the second thermal decay rate requirement have been satisfied, and when the second data density is greater than the first data density.

28. The method of claim 23 wherein the data density at which to record data on the first disk surface is equal to the second data density when the first thermal decay rate requirement has not been satisfied and the second thermal decay rate requirement has been satisfied.

29. The method of claim 22 wherein the first data pattern is written as a single tone frequency.

30. The method of claim 22 wherein the first data pattern is written as a seemingly random sequence of transitions.

31. The method of claim 22 wherein the first data pattern is written in at least one data sector.

32. The method of claim 22 wherein the first data pattern is written on a track near an inner diameter of the disk surface.

33. The method of claim 22 wherein the data density at which to record data on the first disk surface is determined during a self-test procedure.

34. The method of claim 22 wherein the data density at which to record data on the first disk surface is stored in memory.

35. The method of claim 34 wherein a data density at which to record data on at least a second disk surface is added to the data density at which to record data on the first disk surface to determine whether a total storage capacity of the disk drive has been met.

36. The method of claim 35 wherein the disk drive is considered to have passed a self-test procedure if the total storage capacity of the disk drive has been met.

37. An apparatus comprising:
- at least one disk surface;
- a head for reading information from and writing information onto the disk surface;
- means for determining a first thermal decay rate of the disk surface at a first data density;
- means for determining a second thermal decay rate of the disk surface at a second data density;
- means for selecting a density at which to record data on the disk surface based upon whether the first thermal decay rate satisfies a first thermal decay rate requirement and whether the second thermal decay rate satisfies a second thermal decay rate requirement.

38. The apparatus of claim 37 wherein the data density at which to record data on the first disk surface is equal to the first data density when the first thermal decay rate requirement has been satisfied and the second thermal decay rate requirement has not been satisfied.

39. The apparatus of claim 37 wherein the data density at which to record data on the first disk surface is equal to the first data density when both the first thermal decay rate requirement and the second thermal decay rate requirement have been satisfied, and when the first data density is greater than the second data density.

40. The apparatus of claim 37 wherein the data density at which to record data on the first disk surface is equal to the second data density when both the first thermal decay rate requirement and the second thermal decay rate requirement have been satisfied, and when the second data density is greater than the first data density.

41. The apparatus of claim 37 wherein the data density at which to record data on the first disk surface is equal to the second data density when the first thermal decay rate requirement has not been satisfied and the second thermal decay rate requirement has been satisfied.

42. The apparatus of claim 37 wherein the first data pattern is written as a single tone frequency.

43. The apparatus of claim 37 wherein the first data pattern is written as a seemingly random sequence of transitions.

* * * * *